US008527508B2

(12) United States Patent  
Takahashi et al.

(10) Patent No.: US 8,527,508 B2
(45) Date of Patent: Sep. 3, 2013

(54) INPUT ASSISTANCE DEVICE, METHOD THEREOF, AND NON-TRANSITORY STORAGE MEDIUM STORING INPUT ASSISTANCE PROGRAM

(75) Inventors: Kazuma Takahashi, Takamatsu (JP); Kazuo Yamakawa, Takamatsu (JP); Isao Sumito, Takamatsu (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/041,885

(22) Filed: Mar. 7, 2011

(65) Prior Publication Data

US 2011/0225149 A1 Sep. 15, 2011

(30) Foreign Application Priority Data

Mar. 11, 2010 (JP) ................................ 2010-054482

(51) Int. Cl.
*G06F 7/00* (2006.01)
*G06F 17/30* (2006.01)

(52) U.S. Cl.
USPC ........................................................ 707/723

(58) Field of Classification Search
USPC .......................................... 707/723, 999.004
See application file for complete search history.

(56) References Cited

U.S. PATENT DOCUMENTS

| 7,440,931 B1 | 10/2008 | Suzuki |
| 2005/0283468 A1* | 12/2005 | Kamvar et al. ................. 707/3 |
| 2006/0248474 A1 | 11/2006 | Kimotsuki |
| 2008/0109401 A1* | 5/2008 | Sareen et al. ................. 707/3 |
| 2009/0119289 A1* | 5/2009 | Gibbs et al. ................... 707/5 |

FOREIGN PATENT DOCUMENTS

| JP | 2001-155063 | 6/2001 |
| JP | 2001-265904 | 9/2001 |
| JP | 2003-271732 | 9/2003 |
| JP | 2006-309429 | 11/2006 |

* cited by examiner

*Primary Examiner* — Aleksandr Kerzhner
(74) *Attorney, Agent, or Firm* — Staas & Halsey LLP

(57) ABSTRACT

An input assistance device includes: an operation unit configured to accept information selected by a user from a plurality of input candidates; a storage unit configured to store a priority for displaying the plurality of input candidates according to a display order, the priority determined based on an input history of information accepted by the operation unit in association with each of the plurality of input candidates; and a control unit configured to refer to the storage unit, to change the display order of the input candidates determined based on the priority into other display order by replacing a first input candidate among the plurality of input candidates in a first range from a top percentile priority with a second input candidate in a second range that is outside of the first range, and to output the plurality of input candidates according to the other display order.

18 Claims, 12 Drawing Sheets

FIG. 2A

| NO APPETITE |
| HAVE COUGH |
| BLOKEN BONES |
| SORE THROAT |
| DIARREHEA |
| HAVE FEVER |
| HAVE NUMBNESS IN ONE'S FEET |
| SWOLLEN HAND |
| HAVE HEADACHE |
| HAIR LOSS |
| ⋮ |

FIG. 2B

| HAVE FEVER |
| HAVE COUGH |
| HAVE HEADACHE |
| SORE THROAT |
| DIARREHEA |
| NO APPETITE |
| HAVE NUMBNESS IN ONE'S FEET |
| SWOLLEN HAND |
| BLOKEN BONES |
| HAIR LOSS |
| ⋮ |

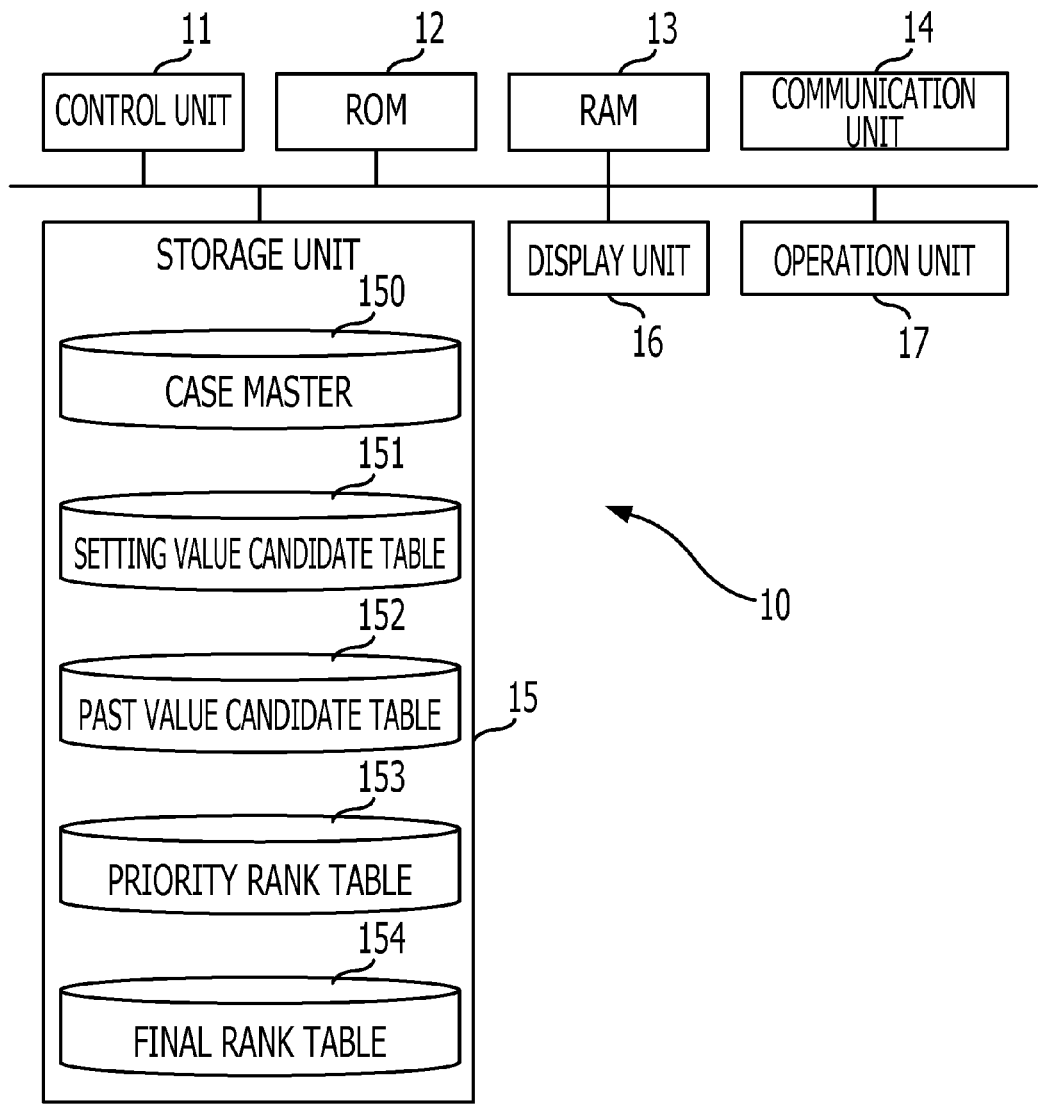

| ITEM ID | SYMPTOM |
|---|---|
| AA01 | HAVE NUMBNESS IN ONE'S FEET |
| AA02 | SWOLLEN HAND |
| ⋮ | ⋮ |
| BB01 | HAVE FEVER |
| BB02 | HAVE COUGH |
| ⋮ | ⋮ |

| NO. | ITEM NAME | DEGREE OF PRIORITY | ITEM ID |
|---|---|---|---|
| 01 | SYMPTOM | 1 | AA01 |
| 02 | SYMPTOM | 2 | AA02 |
| 03 | SYMPTOM | 3 | AA03 |
| ⋮ | SYMPTOM | ⋮ | ⋮ |
| 09 | SYMPTOM | 9 | AA09 |
| 10 | SYMPTOM | 10 | AA10 |

| NO. | ITEM NAME | DEGREE OF PRIORITY | ITEM ID | THE NUMBER OF INPUTS | THE LAST INPUT DATE AND TIME |
|---|---|---|---|---|---|
| 01 | SYMPTOM | 1 | BB01 | 32 | 2.01,10:10 |
| 02 | SYMPTOM | 2 | BB02 | 28 | 2.01,10:11 |
| 03 | SYMPTOM | 3 | BB03 | 16 | 1.28,09:31 |
| ⋮ | SYMPTOM | ⋮ | ⋮ | ⋮ | ⋮ |
| 09 | SYMPTOM | 9 | BB09 | 10 | 1.17,11:20 |
| 10 | SYMPTOM | 10 | BB10 | 5 | 1.11,10:36 |

| NO. | ITEM NAME | DEGREE OF PRIORITY | ITEM ID |
|---|---|---|---|
| 01 | SYMPTOM | 1 | BB01 |
| 02 | SYMPTOM | 2 | BB02 |
| 03 | SYMPTOM | 3 | BB03 |
| 04 | SYMPTOM | 4 | BB04 |
| 05 | SYMPTOM | 1 | AA01 |
| 06 | SYMPTOM | 2 | AA02 |
| 07 | SYMPTOM | 3 | AA03 |
| 08 | SYMPTOM | 4 | AA04 |
| 09 | SYMPTOM | 9 | BB09 |
| 10 | SYMPTOM | 10 | BB10 |

| NO. | ITEM NAME | DEGREE OF PRIORITY | ITEM ID |
|---|---|---|---|
| 06 | SYMPTOM | 2 | AA02 |
| 02 | SYMPTOM | 2 | BB02 |
| 09 | SYMPTOM | 9 | BB09 |
| 04 | SYMPTOM | 4 | BB04 |
| 05 | SYMPTOM | 1 | AA01 |
| 01 | SYMPTOM | 1 | BB01 |
| 07 | SYMPTOM | 3 | AA03 |
| 08 | SYMPTOM | 4 | AA04 |
| 03 | SYMPTOM | 3 | BB03 |
| 10 | SYMPTOM | 10 | BB10 |

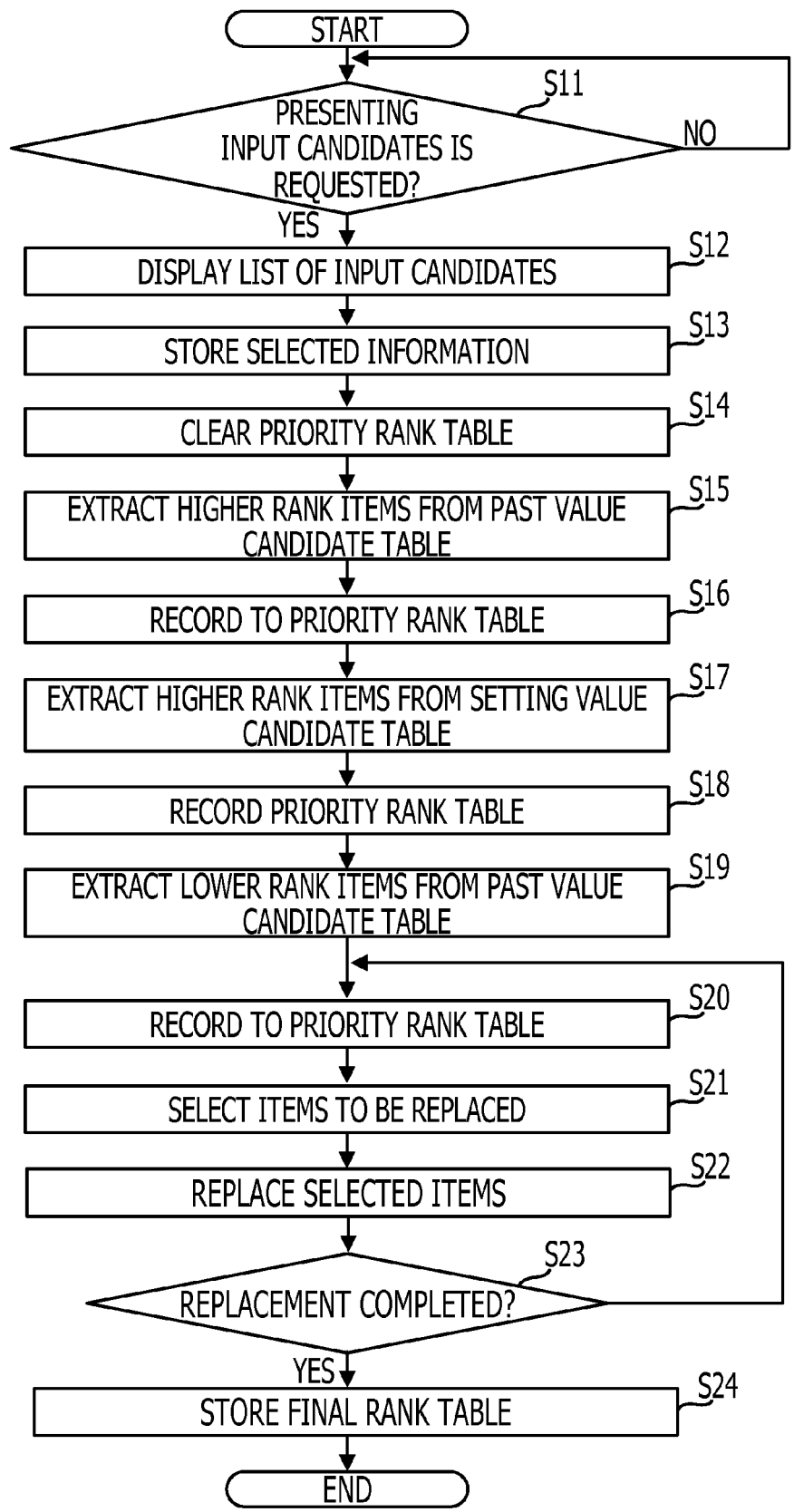

FIG. 7

| USER ID | ITEM NAME | SYMPTOM | ITEM ID | DISPLAY ORDER |
|---|---|---|---|---|
| EDC-R001 | SYMPTOM | SWOLLEN HAND | AA01 | 01 |
| EDC-R002 | SYMPTOM | SORE THROAT | BB04 | 04 |
| EDC-R003 | MEDICAL HISTORY | DIABETES | XX01 | 06 |
| ⋮ | ⋮ | ⋮ | ⋮ | ⋮ |

| USER ID | DISPLAY LANK | THE NUMBER OF SELECTIONS | 156 |
|---|---|---|---|
| EDC-R001 | 01 | 57 | |
| | 02 | 21 | |
| | 03 | 8 | |
| | ⋮ | ⋮ | |
| EDC-R002 | 01 | 13 | |
| | 02 | 18 | |
| | 03 | 9 | |
| | ⋮ | ⋮ | |
| ⋮ | | | |

FIG. 10

| SYMPTOM | ITEM ID | DEGREE OF PRIORITY | EVALUATION VALUE 157 |
|---|---|---|---|
| HAVE FEVER | BB01 | 1 | 01 |
| HAVE COUGH | BB02 | 2 | 01 |
| HAVE HEADACHE | BB03 | 3 | 01 |
| SORE THROAT | BB04 | 4 | 01 |
| DIARRHEA | BB05 | 5 | 03 |
| NO APPETITE | BB06 | 6 | 03 |
| ⋮ | ⋮ | ⋮ | ⋮ |
| HAVE NUMBNESS IN ONE'S FEET | AA01 | 1 | 05 |
| SWOLLEN HAND | AA02 | 2 | 05 |
| ⋮ | ⋮ | ⋮ | ⋮ |

FIG. 11

| USER ID | ITEM NAME | ACCUMULATED VALUE | THE NUMBER OF SELECTIONS | AVERAGE VALUE | THRESHOLD |
|---|---|---|---|---|---|
| EDC-R001 | SYMPTOM | 370 | 37 | 10 | 5 |
| EDC-R001 | MEDICAL HISTORY | 100 | 10 | 10 | 8 |
| EDC-R002 | SYMPTOM | 200 | 100 | 2 | 5 |
| ⋮ | ⋮ | ⋮ | ⋮ | ⋮ | ⋮ |

INPUT ASSISTANCE DEVICE, METHOD THEREOF, AND NON-TRANSITORY STORAGE MEDIUM STORING INPUT ASSISTANCE PROGRAM

CROSS-REFERENCE TO RELATED APPLICATIONS

This application is based upon and claims the benefit of priority of the prior Japanese Patent Application No. 2010-54482, filed on Mar. 11, 2010, the entire contents of which are incorporated herein by reference.

FIELD

The embodiments discussed herein relate to an input assistance device that presents input candidates when information input is accepted, an input assistance method, and a non-transitory storage medium that stores an input assistance program.

BACKGROUND

Recently, there are systems that assist a user to input a search key when a search key input is accepted on a search site over the Internet. For example, when the first character of a search key is input, a plurality of words that includes subsequent characters is presented to the user. The user can easily input the search key by using a mouse or a cursor key.

An input assistance system generally provides a learning function. The input assistance system creates a list of candidates with high possibilities to be input based on an input history of the search key. The input assistance system presents the list to the user. The list is created so that a candidate with a higher possibility to be input is listed in a higher rank in the list. Thus, the user may select (input) a desired search key without moving a mouse pointer much. The input assistance system substantially reduces an input burden on the user compared with when characters that represent the search key are input through the keyboard.

However, in the above described input assistance system; an order effect is caused in which a selection by the user may be biased according to the order of list. In other words, the input assistance system is likely to guide the user's input.

Accordingly, Japanese Laid-open Patent Publication No. 2001-265904 discusses a system that prevents guiding an input by presenting a plurality of responses in a random order.

Moreover, Japanese Laid-open Patent Publication No. 2003-271732 discusses a system that does not provide a learning function but provides a definition table in which a display order in each screen is defined and items are specified according to the definition table.

SUMMARY

According to an aspect of the invention, an input assistance device includes: an operation unit configured to accept information selected by a user from a plurality of input candidates; a storage unit configured to store a priority for displaying the plurality of input candidates according to a display order, the priority determined based on an input history of information accepted by the operation unit in association with each of the plurality of input candidates; and a control unit configured to refer to the storage unit, to change the display order of the input candidates determined based on the priority into other display order by replacing a first input candidate among the plurality of input candidates in a first range from a top percentile priority with a second input candidate in a second range that is outside of the first range, and to output the plurality of input candidates according to the other display order The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A and 2B are schematic views illustrating lists of input candidates displayed by the input assistance device.

FIG. 3 is a hardware configuration diagram of the input assistance device according to the embodiment.

FIGS. 4A and 4C are schematic views illustrating examples of each table.

FIGS. 5A and 5B are schematic views illustrating examples of each table.

FIG. 6 is a flow chart illustrating processing executed by the input assistance device when input candidates are presented to an operator.

FIG. 7 is a schematic view of an example of a log management unit.

FIG. 8 is a schematic view of an example of a tabulation table.

FIG. 10 is a schematic view of an evaluation value table.

FIG. 11 is a schematic view of an evaluation value tabulation table.

DETAILED DESCRIPTION OF EMBODIMENTS

In the technology discussed in Japanese Laid-open Patent Publication No. 2001-265904, a burden on a user to find a desired response from input candidates is large if the number of input candidates is too many. Thus, the technology has a drawback that substantially increases a work load for the input operation.

Meanwhile, even if a display order is defined without having a learning function as in the technology discussed in Japanese Laid-open Patent Publication No. 2003-271732, an order effect may be caused in a list of input candidates.

The inventors propose an input assistance device to present input candidates that reduces if not prevents guiding an input while ensuring an input efficiency, method thereof, and a storage medium storing an input assistance program.

Hereinafter, the present disclosure will be described by referring to drawings illustrating embodiments. The first to the third embodiments hereinafter describe an input assistance device that, in a non-limiting example, is applied to an information processing device installed in hospitals and pharmaceutical companies and that manages and calculates as input candidates symptoms of patients or clinical-trial patients.

First Embodiment

Figure 1:
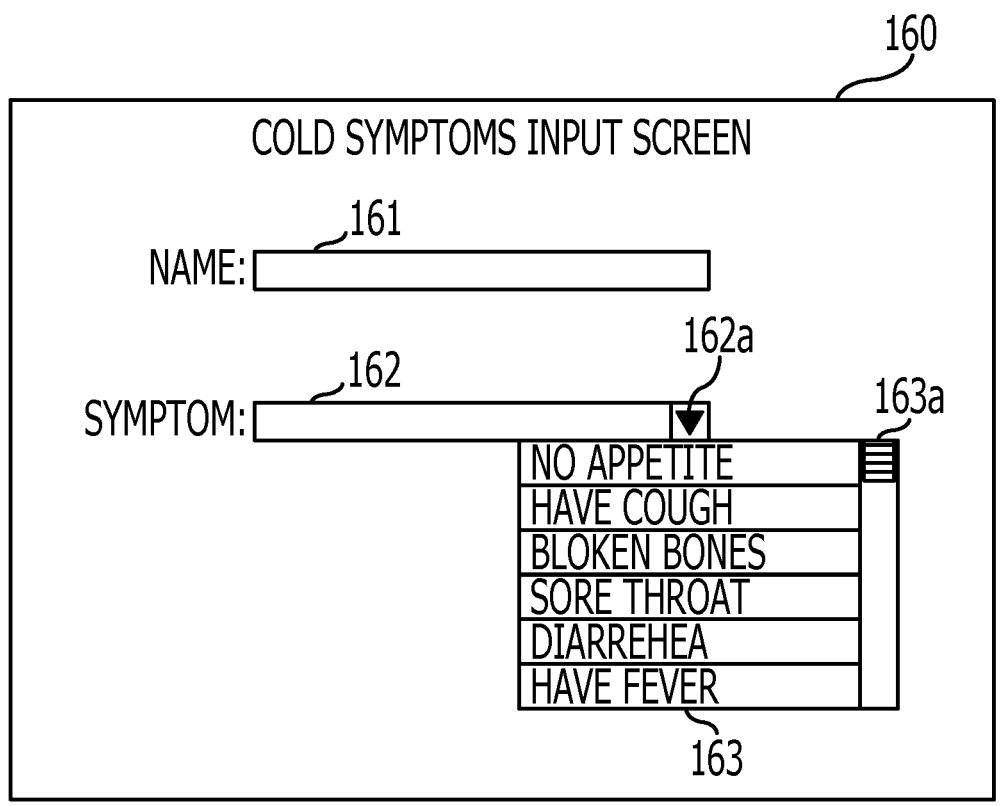
FIG. 1 is an example of an input screen displayed by an input assistance device according to an embodiment.

FIG. 1 is an example of input candidates displayed by an input assistance device according to the embodiment. An input assistance device 10 according to the embodiment may be a computer such as a personal computer and a workstation. The input assistance device 10 is installed, for example, in hospitals and pharmaceutical companies and accepts information on symptoms of patients or clinical-trial patients. An input screen 160 provided by the input assistance device 10 presents a name input column 161 to accept a patient name and a symptom input column 162 to accept symptoms of the patient.

When an operator inputs a name in the input column 161 and symptoms in the input column 162 by using a keyboard of the input assistance device 10, the operator selects the input column 161 and the input column 162 by using a pointing device such as a mouse. The operator inputs the name and the symptoms using the keyboard. A push button 162a to display an input candidate list is placed at a right edge of the symptom input column 162. When the push button 162a is pressed, for example, by a pointing device, the input assistance device 10 displays a drop down format window 163 as illustrated in FIG. 1. The input assistance device 10 displays an input candidate list in the window 163. A display area may be changed, for example, by moving a cursor in the list or by moving a slider 163a that is placed at a right edge of the list if there are too many candidates to display in the window 163 and there are more input candidates that are not displayed in the window 163.

According to the embodiment, an input candidate list is displayed in a drop down format window 163. However, the input candidate list may be displayed in a pull down format window or a pop up format window.

Moreover, when items to be input is fixed as in the symptom input column 162 according to the embodiment, the push button 162a for displaying the input candidate list is not necessarily placed (i.e., the list of items to be displayed can fit a fixed, allowable, permitted, or target display area on the display screen while omitting a display screen scroll bar or function). For example, the input assistance device 10 displays an input candidate list triggered by a selection of the symptoms input column 162 by a pointing device.

Furthermore, a plurality of symptoms input columns 162 may be placed in order to accept inputs of a plurality of symptoms. Alternatively, input of symptoms may be repeated by using one symptom input column 162.

FIGS. 2A and 2B are schematic views illustrating lists of input candidates displayed by the input assistance device 10. In conventional technologies, input candidates with higher possibility to be input are placed in higher ranks in the list. Meanwhile, input candidates with a lower possibility to be input are placed in lower ranks in the list. The conventional technologies' guide may bias an input operation by an operator. For example, the conventional technology learns from past input results and ranks input candidates so that symptoms with higher input frequencies comes higher ranks in the list while symptoms with lower input frequencies comes lower ranks in the list. The list to which the ranking result is reflected is displayed.

As a result, symptoms with higher input frequencies in the past are displayed at higher ranks in the list while symptoms with lower input frequencies in the past are displayed at lower ranks in the list. As learning progresses, input candidates with higher possibilities to be input are displayed in a position that is easier to select. Thus, an operator may select an input candidate easily by using, for example, a pointing device because.

As described above, the input is likely to be completed when an operator selects an input candidate from a higher rank in the list. Accordingly, the conventional technology may significantly reduce an input burden on an operator compared with when the operator directly inputs characters by using a keyboard. Therefore, the conventional technologies allow to improve work efficiency.

However, an operator tends to select an input candidate from a higher rank in the list when input candidates are displayed according to input frequencies in the past. In other words, the selection by the operator may be biased by displaying input candidates in the order according to input frequencies in the past. Namely, an order effect is adversely caused when an operator selects an input candidate, and correct symptoms may not be recorded and collected. In addition, bias of the input candidate guide or bias of the operator selection may be further increases in circumstances when the display area allows a limited number of input candidates to be displayed, requiring more input burden on the operator to scroll or view to additional input candidates.

The input assistance device 10 according to the embodiment generates an input candidate list to be displayed in a window according to a procedure which will be described later. Simply put, the procedure includes moving input candidates displayed in lower ranks to higher ranks in a portion of an input candidate list that is ranked by the learning function.

For example, an input candidate list ranked by the learning function is assumed to include "have a fever", "have a cough", "have a headache", "have a sore throat", ..., "broken bone", and "hair loss" as illustrated in FIG. 2B. The symptoms in the higher ranks in the list, such as "have a fever", "have a cough", "have a headache", and "have a sore throat" are common symptoms for a cold. Accordingly, the symptoms are likely to be input. On the other hand, the symptoms such as "broken bone" and "hair loss" are not common symptoms for a cold, and the symptoms are less likely to be input.

According to the embodiment, an input candidate list ranked by the learning function is not displayed as it is (the state illustrated in FIG. 2b). The list is generated by moving a portion of input candidates in the lower ranks of the list (In FIG. 2B, for example, the input candidate, "broken bone") to the higher ranks in the list and is presented to the operator.

According to the embodiment, when a portion of input candidates in the lower ranks of the list is moved to the higher ranks in the list, an input candidate that is present in the move destination (In FIG. 2B, for example, the input candidate, "have a headache") is moved to the lower rank in the list. In other words, replacement processing is performed in which the input candidate present in the higher rank in the list is replaced with the input candidate present in the lower rank in the list. FIG. 2A illustrates the input candidate list obtained by the replacement processing.

FIG. 3 is a hardware configuration diagram of the input assistance device 10 according to the embodiment. The input assistance device 10 includes a control unit 11, a Read Only Memory (ROM) 12, a Random Access Memory (RAM) 13, a communication unit 14, a storage unit 15, a display unit 16, and an operation unit 17. The above-described components are interconnected with each other through a bus.

The control unit 11 includes a Central Processing Unit (CPU) or a Micro Processing Unit (MPU). When an MPU is included, the ROM 12 and the RAM 13 may be incorporated in the control unit 11.

The control unit 11 reads a computer program stored in the ROM 12 or the storage unit 15 and writes to the RAM 13 and executes the program at an appropriate timing, and controls operations of each of the above-described hardware components.

The ROM 12 stores desired programs to achieve the input assistance method according to the embodiment, and to operate each of the above-described hardware components. Moreover, the ROM 12 stores data such as GUI parts displayed on a screen for example, an input screen 160.

According to the embodiment, computer programs desired to achieve the input assistance method according to the embodiment and to operate each of the above-described hardware components are stored in the ROM 12. However, these computer programs may be stored in the storage unit 15.

The RAM 13 is, for example, a Dynamic RAM (DRAM), a Static RAM (SRAM), and a flash memory. The RAM 13 temporarily stores various data generated when the control unit 11 executes computer programs. Various data may be, for example, calculation results and various parameters.

The communication unit 14 includes a communication interface for performing a wired or wireless communication with an external communication network. Other than the input assistance device 10 according to the embodiment, a communication device (not illustrated) used by a system administrator who manages the input assistance device 10 is connected to the communication network.

The operation unit 17 is, for example, a keyboard and a mouse, and includes an input interface to accept information input. The display unit 16 is, for example, a liquid crystal display. The display unit 16 displays information, for example, that is input through the operation unit 17 according to an instruction from the control unit 11 and information to be notified to an operator.

The storage unit 15 is a nonvolatile storage device such as a hard disk or a flash memory. A portion of storage areas of the storage unit 15 is used for a case master 150, a setting value candidate table 151, a past value candidate table 152, a priority rank table 153, and a final rank table 154.

FIGS. 4A and 4B and FIGS. 5A and 5B are schematic views illustrating examples of each table. FIG. 4A illustrates an example of the case master 150. The case master 150 stores an item ID in association with a symptom. The item ID is an identifier to identify each item in the setting value candidate table 151 and the past value candidate table 152. For example, items with item IDs, AA01, AA02 . . . indicate items used in the setting value candidate table 151. For example, items with item IDs BB01, BB02 . . . indicate items used in the past value candidate table 152.

In the example illustrated in FIG. 4A, a symptom "have numbness in one's feet" is assigned to an item with an item ID AA01, while a symptom "swollen hand" is assigned to an item with an item ID AA02. On the other hand, a symptom "have a fever" is assigned to an item with an item ID BB01, while a symptom "have a cough" is assigned to an item with an item ID BB02.

FIG. 4B is an example of the setting value candidate table 151. The setting value candidate table 151 associates and stores an item name, a degree of priority, and item ID. The item name indicates a category of each item. According to the embodiment, symptoms are recorded in all item names. The degree of priority indicates an original order to be displayed when input candidates are displayed. An item ID registered in the case master 150 is recorded in the item ID.

In the setting value candidate table 151, each of the items can be manually input, for example, by the system administrator and/or updated automatically as necessary, as an initial setting value candidate table 151. The table is static because the contents of the tables are not changed during operations.

FIG. 4C illustrates an example of the past (historical) value candidate table 152. The past value candidate table 152 associates and stores an item name, a degree of priority, an item ID, the number of inputs of the symptom, and a final input date and time. According to the embodiment, the item name is a symptom and the degree of priority is an original display order when input candidates are displayed. An item ID registered in the case master 150 is recorded in the item ID column. The number of inputs of the applicable symptom is incremented every time the symptom is input in the number of inputs of the symptom column. Input date and time of the applicable symptom is updated every time the symptom is input in the final input date and time column.

The input assistance device 10 learns from the past input results and updates the degree of priority in the past value candidate table 152. The update of the degree of priority in the past value candidate table 152 is performed by assigning priorities to items in the order that the number of inputs is higher. Alternatively, a higher priority may be assigned to items that the last input date and time is earlier. Moreover, the degree of priority may be updated by combining the number of inputs and the last input date and time.

The input assistance device 10 rearranges symptom items according to the updated degree of priority in a descending order. The past value candidate table 152 is a dynamic table that is updated every time a symptom is input through the symptom input column.

The same symptom item as the setting value candidate table 151 may be present in the past value candidate table 152.

FIG. 5A is an example of the priority rank table 153. The priority rank table 153 is a temporally table created by mixing items recorded in the setting value candidate table 151 and the past value candidate table 152. The input assistance device 10 creates the priority rank table 153 by an appropriate timing such as after updating the past value candidate table 152.

For example, the input assistance device 10 extracts items with top 40 percent of the higher priority among all items recorded in the past value candidate table 152 (or in other words, extract items with priorities in the top 40 percent of priorities) and records the extracted items to the priority rank table 153. The input assistance device 10 extracts items with top 40 percent of the higher priorities among all items recorded in the setting value candidate table 151. The input assistance device 10 records the extracted items at a lower rank side below the items already recorded. Moreover, the input assistance device 10 extracts the lowest 20 percent of the degree of priority among all items recorded in the past value candidate table 152. The input assistance device 10 records the extracted items at a lower rank side below the items already recorded. The lowest 20 percent of the degree of priority in the past value candidate table 153 is recorded below items with top 40 percent of the higher priority in the past value candidate table 152 and the setting value candidate table 151.

The input assistance device 10 creates the priority rank table 153 by mixing items recorded in the setting value candidate table 151 and items recorded in the past value candidate table 152. If there is any overlapped item in the priority rank table 153, the input assistance device 10 may delete one of the items from the priority rank table 153 to clear the overlap.

In the priority rank table 153 illustrated in FIG. 5A, the degree of priority indicates a degree of priority in the original tables. However, the input assistance device 10 may reassign the degree of priorities in the descending order when a creation of the priority rank table 153 is completed.

According to the embodiment, the top 40 percent of the setting value candidate table 151, the top 40 percent and the lowest 20 percent of the past value candidate table 152 are extracted. However, a ratio to extract items from each of the tables may be set as needed. Note that a ratio to extract the lowest items is desired to be lower than a ratio to extract the top items.

FIG. 5B illustrates an example of the final rank table 154. According to the embodiment, the input assistance device 10 creates the final rank table 154 that indicates the final rank of the input candidates by replacing a portion of items in the higher ranks and the lower ranks recorded in the priority rank table 153. The final rank table 154 is created by the input assistance device 10 at an appropriate timing, for example, immediately after the priority rank table 153 is created.

When the final rank table 154 is created, an item in a higher rank (for example, the third item) is replaced with an item in a lower rank (for example, the ninth item). Moreover, in the example illustrated in FIG. 5, an item in the highest rank and an item in a medium rank (for example, the sixth item) in the priority rank table 153 is replaced as well.

According to the embodiment, the final rank table 154 as illustrated in FIG. 5B is created by replacing higher rank items with the lower rank items. In the final rank table 154 as illustrated in FIG. 5B, the four items in the higher ranks include two items that are in the higher ranks before the replacement (50 percent), one item that is in the medium rank before the replacement (25 percent) and one item that is in the lower rank before the replacement (25 percent).

Replacement target items are not limited to those described in the above example. The input assistance device 10 can randomly select one item from higher rank items (for example, items in top 40 percent in the priority rank table 153) and one item from lower rank items (for example, items in the lowest 20 percent in the priority rank table 153). The input assistance device 10 may replace both items.

Moreover, the number of items to be replaced is not limited to the above-described examples. Increasing a ratio of replacing higher rank items increases a ratio of items with fewer selection histories are included in input candidates presented to an operator. Thus, input efficiency may be reduced. Accordingly, setting a certain upper limit to a ratio of replacement is desired. The certain upper limit is, for example, top 50 percent of higher rank items.

Hereinafter a procedure to present input candidates to an operator will be described. FIG. 6 is a flow chart illustrating processing executed by the input assistance device 10 when input candidates are presented to an operator. It is assumed that the setting value candidate table 151 and the past value candidate table 152 are already created, and the past value candidate table 152 is updated as appropriate by the learning function.

The control unit 11 of the input assistance device 10 determines that presenting input candidates is requested (S11). According to the embodiment, it is determined that presenting input candidates is requested when the push button 162a placed at the right edge of the symptom input column 162 is pressed, for example, by a pointing device such as a mouse.

If it is determined that presenting input candidates is not requested (S11: No), the control unit 11 returns to S11 and waits until presenting input candidates is requested.

If it is determined that presenting input candidates is requested (S11: Yes), the control unit 11 calls the drop down format window 163 as GUI parts to be displayed on the input screen 160 from the ROM 12. The control unit 11 displays a list of input candidates according to a display order specified by the final rank table 154 in the drop down format window 163 (S12).

If the final rank table 154 is not created at the time, the final rank table 154 is created by executing processing S14 which will be described later and the processing thereafter and input candidates may be displayed according to the created final rank table 154. Alternatively, a list of input candidates may be displayed exceptionally according to a display order specified by the setting value candidate table 151 and/or the past value candidate table 152.

The control unit 11 stores information (symptom) selected from the input candidates in the storage unit 15 (S13). If, for example, a selection of an input candidate at S13 changes any priority in the past value candidate table 152, the input assistance device 10 updates the past value candidate table 152.

The input assistance device 10 creates the priority rank table 153 by using the setting value candidate table 151 and the past value candidate table 152. At the time, the control unit 11 of the input assistance device 10 clears the priority rank table 153 (S14).

The control unit 11 extracts higher rank items from the past value candidate table 152 (S15), and records the extracted higher ranks items to the priority rank table 153. Here, the higher rank items are items that exist in a certain range (a first range) from a top percent of items in the past value candidate table 152. According to the embodiment, the top 40 percent among all items are extracted as higher rank items.

The control unit 11 extracts higher rank items from the setting value candidate table 151 (S17). The control unit 11 records the extracted higher rank items to the priority rank table 153 as lower rank items of the items already recorded (S18).

The control unit 11 extracts lower rank items from the past value candidate table 152 (S19). The control unit 11 records the extracted lower rank items to the priority rank table 153 as lower rank items of the items already recorded (S20). The lower rank items are items that are present in a certain range (a second range) from a lowest percent of items. According to the embodiment, the lowest 20 percent among all items are extracted as lower rank items.

The priority rank table 153 is created through processing of S15 to S20. The input assistance device 10 creates the final rank table 154 by using the created priority rank table 153.

The control unit 11 of the input assistance device 10 selects two items to be replaced from the created priority rank table 153 (S21). One of the items to be selected is an item in a higher rank and the other item is that in a lower rank in the priority rank table 153. Note that the other item may be an item in a medium rank in the priority rank table 153.

The control unit 11 performs processing to replace the two items selected at S21 (S22).

The control unit 11 determines whether replacement processing is completed (S23). For example, the number of times to execute the replacement processing is defined and whether the number of times is reached is determined. The control unit 11 ends the replacement processing when the number of times is reached. Alternatively, a ratio of items to be replaced in higher rank items of the priority rank table 153 is defined and whether the ratio of items to be replaced reaches is determined. If the ratio is reached, the control unit 11 ends the replacement processing.

If the replacement processing is not ended (S23: No), the control unit 11 repeats the processing of replacing higher rank items with lower rank items (S21).

If the replacement processing is ended (S23: Yes), the control unit 11 stores the priority rank table 153 to which the replacement processing is applied in the storage unit 15 as the final rank table 154 (S24).

As described above, according to the embodiment, a display order obtained by the learning function may be maintained to a certain degree. Meanwhile, according to the embodiment, originally lower rank items in the display order may be displayed together with the higher rank items. Hence, desired information may be input by a selection operation using a pointing device such as a mouse. Accordingly, a burden of input operation on an operator is reduced. On the other hand, in some cases, the operator may psychologically try to avoid selecting items with lower possibility to be selected. However, according to the embodiment, both higher rank items and lower rank items may be displayed, and therefore it is considered the operator makes a selection cautiously while confirming the presented list of input candidates. Thus, according to the embodiment, an easy selection that involves an order effect may be reduced.

According to the embodiment, the priority rank table 153 is created by mixing items extracted from both the setting value candidate table 151 and the past value candidate table 152. However, the priority rank table 153 may be created typically by the past value candidate table 152. In this case, for example, the input assistance device 10 extracts top 40 percent and the lowest 20 percent of items in the past value candidate table 152 respectively. The input assistance device 10 records the extracted higher rank items and lower ranks to the priority rank table 153 in the order. Substantially the same method may be used when the final rank table 154 is created from the priority rank table 153.

According to the embodiment, the final rank table 154 that defines a final display order to present to an operator is created by replacing higher rank items and lower rank items in the priority rank table 153. However, the input assistance device 10 may not perform the replacement processing. For example, the input assistance device 10 may create the final rank table 154 by inserting one or more items selected from lower rank items in the priority rank table 153 into higher rank items in the priority rank table 153.

When the input assistance device 10 is used by a plurality of operators, a past value candidate table 152 may be prepared for each operator and a final rank table 154 may be created for each operator.

Input candidates to be displayed may be changed whenever an operator selects an input candidate by using the input screen 160. In this case, for example, the display order of the nth item ID may be changed to the display order of the n+1th item ID and the display order of the n+1th item ID to the display order of the n+2th item ID. In other words, the input assistance device 10 may shift the display order in units of items in the final rank table 154.

Second Embodiment

According to the first embodiment, a list of input candidates is presented to an operator in a state that higher rank items and lower rank items of an original display order are mixed.

However, even according to the first embodiment, possibility of causing an order effect by presented input candidates may not be totally denied. Thus, according to the second embodiment, an input history of an operator is managed. An input assistance device 10 according to the second embodiment notifies a system administrator if the input assistance device 10 determines an order effect is caused.

A hardware configuration of the input assistance device 10 according to the second embodiment is substantially the same as that of the first embodiment. However, the input assistance device 10 according to the second embodiment additionally includes a log management unit 155 and a tabulation table 156 in a storage unit 155. The log management unit 155 manages an input history of an operator. The tabulation table 156 manages results of aggregation of the input history for each operator.

Moreover, according to the second embodiment, a user ID to identify an operator is input when a symptom is input. For example, an input column for a user ID is provided in an input screen 160 to input a symptom. The input assistance device 10 accepts an input of a user ID through an operation unit 17.

FIG. 7 is a schematic view of an example of a log management unit 155. The log management unit 155 associates and stores a user ID, an item name, a symptom, an item ID, and a display order. The user ID is an identifier to identify an operator who inputs a symptom in the input screen 160. The item name indicates a category of each item. A symptom and the applicable item ID that are selected through the input screen 160 are recorded in the symptom and the item ID. The display order indicates an order of input candidates displayed in a window 163.

The log management unit 155 is updated every time an operator inputs a symptom through the input screen 160.

FIG. 8 is a schematic view of an example of a tabulation table 156. The tabulation table 156 is a table that aggregates the number of times that higher rank items in a display order is selected for each operator. In the example illustrated in FIG. 8, the number of times that the first to the third items in the display order is selected is aggregated for each operator.

As described in the first embodiment, input candidates presented to an operator is updated as appropriate. Thus, an item that indicates the same display order is not necessarily indicates the same symptom.

According to the second embodiment, the input assistance device 10 refers to the tabulation table 156. The input assistance device 10 determines an order effect is caused when the frequencies that higher rank items are selected is high.

Figure 9:
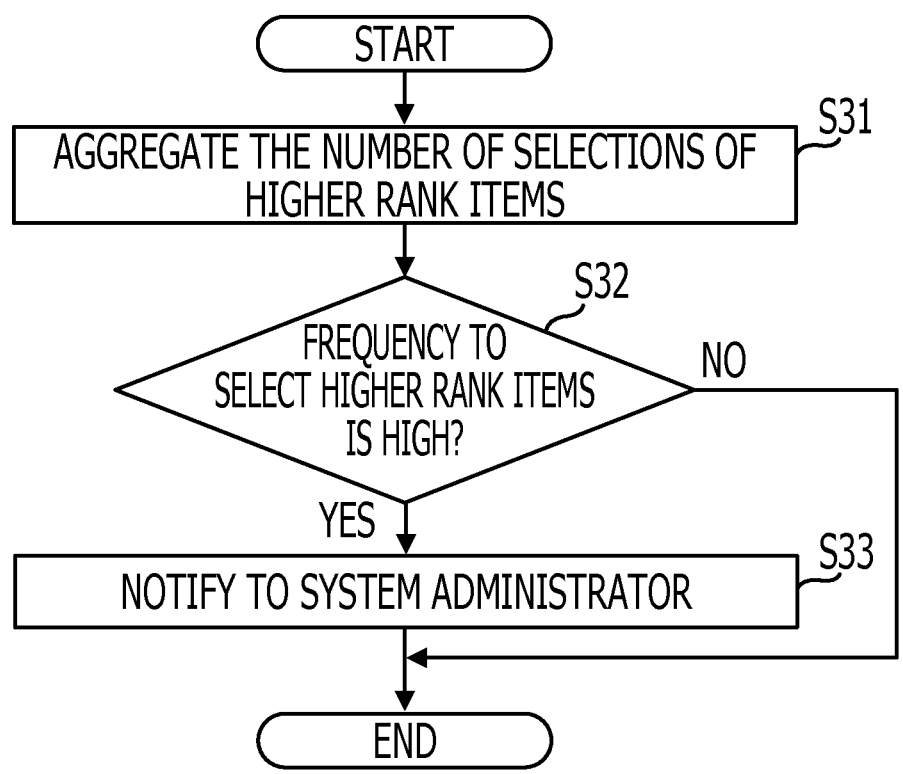
FIG. 9 is a flow chart illustrating processing to determine an order effect.

FIG. 9 is a flow chart illustrating processing to determine an order effect. A control unit 11 of the input assistance device 10 reads information recorded in the log management unit 155. The input assistance device 10 aggregates the number of times that higher rank items is selected for each operator and records the results of aggregation to the tabulation table 156 (S31). Higher rank items to be aggregated may be set as appropriate. However, according to the second embodiment, the first to the third rank items are aggregated.

The control unit 11 determines whether selection frequencies of the higher rank items is high or not based on the aggregated results (S32). For example, a threshold is set for the number of selections. The input assistance device 10 determines that selection frequencies of higher rank items are high if the total number of selections of the first to the third display order is higher than the threshold. Moreover, the input assistance device 10 may determine that the selection frequency of higher rank items is high if the selection frequencies of the first rank item and the second rank item are larger than the selection frequency of the third rank item. For example, selection frequencies of the first rank item and the second rank item are twice or more higher than the selection frequency of the third rank item.

When there is any operator with a high selection frequency of higher rank items (S32: Yes), the operator's name is notified to the system administrator (S33). The notification to the system administrator may be performed, for example, by an electronic-mail, a display in a display unit 16 of the input assistance device 10, and an output of an alert sound.

If there is no operator with a high selection frequency of higher rank items (S32: No), the processing by the flow chart is completed.

As described above according to the second embodiment, a notification to a system administrator is performed. Accordingly, the system administrator may alert an operator who may not input correct information and suppress causing an order effect.

Third Embodiment

According to the second embodiment, when a selection frequency of higher rank items in the presented input candidates is high, the order effect may be determined to be caused. Meanwhile, when a selection frequency of lower rank items in the presented input candidates is high, the order effect may be determined to be caused as well.

A hardware configuration of the input assistance device 10 according to the third embodiment is substantially the same as that of the first embodiment. However, an input assistance device 10 according to the third embodiment includes an evaluation value table 157, and an evaluation value tabulation table 158 in the storage unit 15. The evaluation value table 157 manages evaluation values for each selection item. The evaluation value tabulation table 158 manages aggregated results of evaluation values of input items for each operator and for each item.

FIG. 10 is a schematic view of an evaluation value table 157. The evaluation value table 157 associates and stores a symptom, an item ID, a degree of priority, and an evaluation value. The symptom and the item ID registered in the case master 150 is recorded in the symptom and the item ID. A degree of priority of each item specified by a setting value candidate table 151 and a past value candidate table 152 are recorded in the degree of priority column. A value assigned according to a priority of each item is recorded in the evaluation value column.

According to the third embodiment, the higher the degree of priority, the lower value is assigned as an evaluation value, while the lower the degree of priority, the higher value is assigned as an evaluation value. Thus, as illustrated in FIG. 10, a low evaluation value is set for items that are originally presented in higher ranks in the past value candidate table 152 such as "have a fever", "have a cough", and "have a headache." On the other hand, a high evaluation value is set for items that are originally presented in lower ranks in the setting value candidate table 151 such as "have numbness in one's feet" and "swollen hand."

FIG. 11 is a schematic view of an evaluation value tabulation table 158. The evaluation value tabulation table 158 associates and stores a user ID, an item name, an accumulated value of evaluation values, the number of selections of an item, an average value of evaluation values, and a threshold.

The threshold here is a determination criterion to determine whether the number of selections of an item with a lower degree of priority is large or small. The evaluation value and the threshold is provided, for example, by a system administrator at starting an operation of the system.

According to the third embodiment, the input assistance device 10 determines an order effect is caused if an average value recorded in the evaluation value tabulation table 158 is larger than the threshold. In other words, according to the embodiment, an order effect is determined to be caused if a ratio of the number of selections of items in essentially lower display orders is large for the total number of selections.

Figure 12:
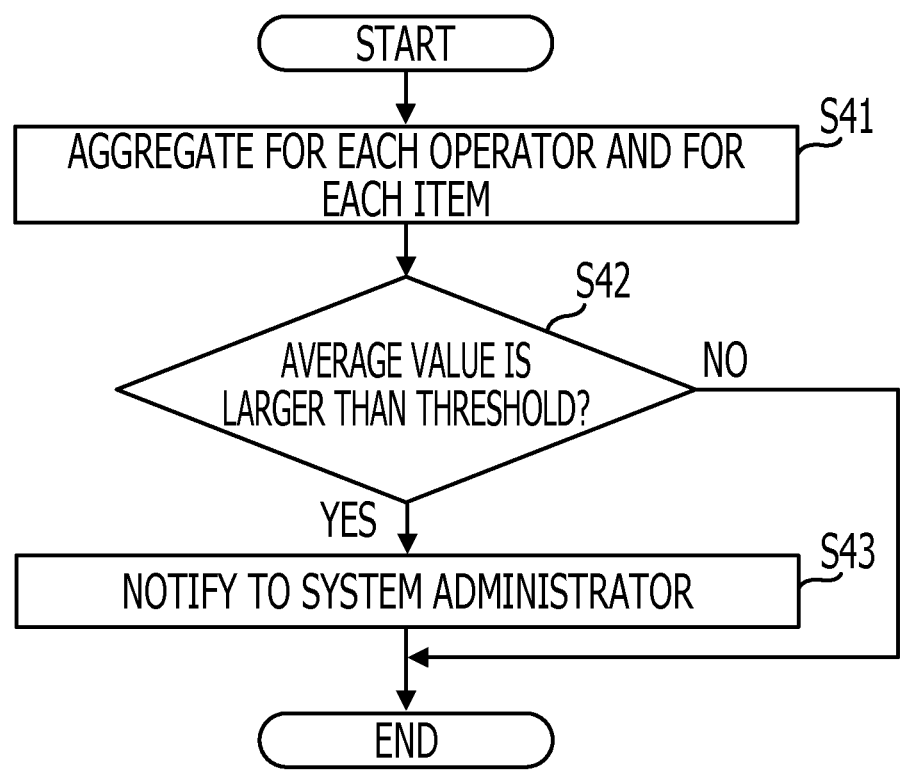
FIG. 12 is a flow chart illustrating processing to determine an order effect.

FIG. 12 is a flow chart illustrating processing to determine an order effect. The control unit 11 of the input assistance device 10 reads the number of inputs and evaluation value for each item from the past value candidate table 152 and the evaluation value table 157 at an appropriate timing such as a periodic timing or timing when the system administrator instructs. The control unit 11 aggregates an accumulated value of an evaluation value, the number of selections, and an average value for each operator and for each item name (S41).

The control unit 11 of the input assistance device 10 compares a magnitude of the average value with the threshold. In other words, the control unit 11 determines whether the average value is larger than the threshold for each operator and for each item name.

If there is any operator whose average value exceeds a threshold (S42: Yes), the operator's name is notified to the system administrator (S43). The notification to the system administrator may be performed, for example, by an electronic-mail, a display in a display unit 16 of the input assistance device 10, and an output of an alert sound.

If there is no operator whose average value exceeds the threshold (S42: No), processing by the flow chart ends.

As described above, according to the third embodiment, if an order effect is determined to be caused, the system administrator is notified. Accordingly, the system administrator may alert an operator who may not input correct information and suppress causing an order effect.

According to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the input assistance device 10) can comprise a controller (CPU) (e.g., a hardware logic circuitry based computer processor that processes or executes instructions, namely software/program (e.g., control unit 11), computer readable media (e.g., ROM 12, RAM 13, storage unit 150), transmission communication interface (network interface) (e.g., communication unit 14), and/or an output device, for example, a display device 16, all in communication through a data communication bus. In addition, an apparatus as a computer system can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing, enabling and/or configuring, one or more apparatuses and/or computer processors to execute the described operations. The results produced can be output to an output device, for example, displayed on the display.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An input assistance device comprising:
a memory configured to store a plurality of input candidates for an input item, and historical values that indicate an input history of each of the plurality of input candidates for the input item; and
one or more processors configured to determine a first display order of the plurality of input candidates based on the historical values, to change the first display order of the plurality of input candidates for the input item into a second display order by replacing a first input candidate from among the plurality of input candidates for the input item in a first range from a top percentile priority with a second input candidate in a second range from another percentile priority that is outside of the first range in the top percentile priority, and to output the plurality of input candidates for the input item, according to the second display order.

2. The input assistance device according to claim 1, wherein the one or more processors are further configured to replace the first display order of a first input candidate corresponding to a first priority with the second display order of a second input candidate corresponding to a second priority that is lower than the first priority.

3. The input assistance device according to claim 1, wherein the one or more processors are further configured to change the first display order to the second display order by replacing a first input candidate with a second input candidate in a second range which is in a certain range from a lowest percentile of priorities.

4. The input assistance device according to claim 1, wherein the one or more processors are further configured to calculate the second display order every time information selected by a user is accepted.

5. The input assistance device according to claim 1, wherein the memory is further configured to store a number of times a user selects an input candidate having a specified priority in the display order; and
the one or more processors are further configured to notify that a number of times an input candidate having the specified priority is selected is equal to or more than a threshold.

6. The input assistance device according to claim 5, wherein the specified priority is a high priority.

7. An input assistance method executed by a computer comprising:
referring to stored plurality of input candidates for an input item, and historical values that indicate an input history of each of the plurality of input candidates for the input item;
determining a first display order of the plurality of input candidates based on the historical values to change the first display order of the plurality of input candidates for the input item into a second display order by replacing a first input candidate from among the plurality of input candidates for the input item in a first range from a top percentile priority with a second input candidate in a second range from another percentile priority that is outside of the first range in the top percentile priority; and
outputting the plurality of input candidates for the input item to a display according to the second display order.

8. The input assistance method according to claim 7, wherein the first display order is changed to the second display order by replacing a first input candidate corresponding to a first priority with a second input candidate corresponding to a second priority that is lower than the first priority.

9. The input assistance method according to claim 7, wherein the first display order is changed to the second display order by replacing a first input candidate with another input candidate from among the plurality of input candidates in a second range which is in a certain range from a lowest percentile of priorities.

10. The input assistance method according to claim 7, wherein the second display order is calculated every time information that is selected by a user is accepted.

11. The input assistance method according to claim 7 further comprising:
referring to stored number of times a user selects an input candidate having a specified priority in a display order; and
notifying a number of times an input candidate having the specified priority is selected is equal to or more than a threshold.

12. The input assistance method according to claim 11, wherein the specified priority is a high priority.

13. A non-transitory storage medium storing an input assistance program, the input assistance program causing the computer to execute:
referring to stored plurality of input candidates for an input item, and historical values that indicate an input history of information of each of the plurality of input candidates for the input item;
determining a first display order of the plurality of input candidates based on the historical values to change the first display order of the plurality of input candidates for the input item into a second display order by replacing a first input candidate from among the plurality of input candidates for the input item in a first range from a top percentile priority with a second input candidate in a second range from another percentile priority that is outside of the first range in the top percentile priority; and
outputting the plurality of input candidates for the input item to a display according to the second display order.

14. The non-transitory storage medium storing the input assistance program according to claim 13, wherein the first display order is changed to the second display order by replacing a first input candidate corresponding to a first priority with a second input candidate corresponding to a second priority that is lower than the first priority.

15. The non-transitory storage medium storing the input assistance program according to claim 13, wherein the first display order is changed to the second display order by replacing a first input candidate with another input candidate from among the plurality of input candidates in a second range which is in a certain range from a lowest percentile of priorities.

16. The non-transitory storage medium storing the input assistance program according to claim 13, wherein the second display order is calculated every time information that is selected by a user is accepted.

17. The non-transitory storage medium storing the input assistance program according to claim 13 further causing the computer to execute:
   referring to stored number of times a user selects an input candidate having a specified priority in a display order; and
   notifying a number of times an input candidate having the specified priority is selected is equal to or more than a threshold.

18. The non-transitory storage medium storing the input assistance program according to claim 17, wherein the specified priority is a high priority.

* * * * *

UNITED STATES PATENT AND TRADEMARK OFFICE
CERTIFICATE OF CORRECTION

PATENT NO. : 8,527,508 B2
APPLICATION NO. : 13/041885
DATED : September 3, 2013
INVENTOR(S) : Kazuma Takahashi et al.

Page 1 of 1

It is certified that error appears in the above-identified patent and that said Letters Patent is hereby corrected as shown below:

In the Claims

In Col. 13, Line 55, In Claim 5, delete "the" and insert -- a --, therefor.

Signed and Sealed this
Twenty-fourth Day of December, 2013

Margaret A. Focarino
*Commissioner for Patents of the United States Patent and Trademark Office*